June 19, 1945. S. PAGANELLO 2,378,787
EYE MOUNTING FOR DOLLS
Filed Oct. 20, 1943
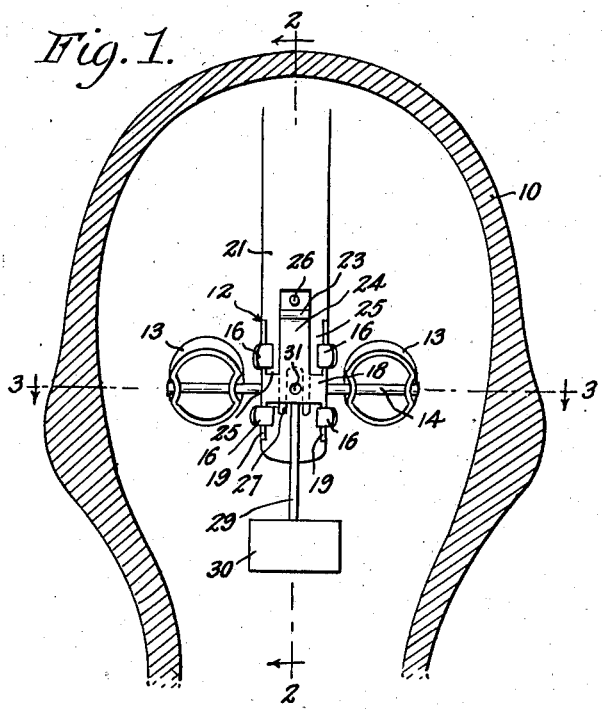
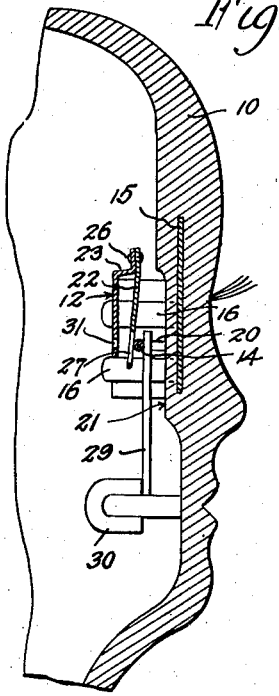
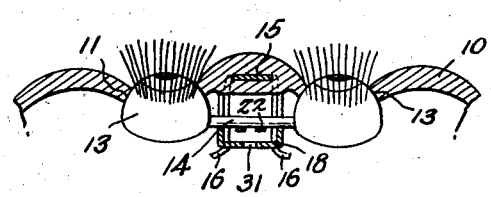
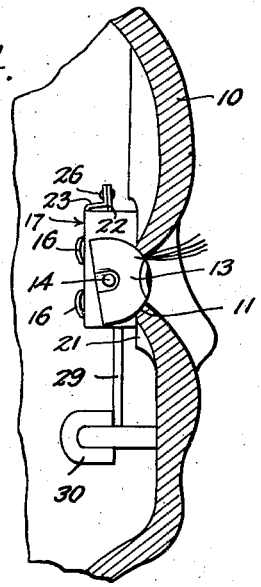
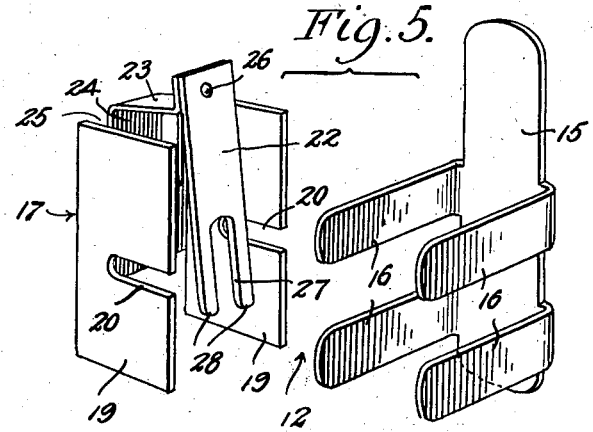
INVENTOR.
Salvatore Paganello
BY Clark & Ott
ATTORNEYS.

Patented June 19, 1945

2,378,787

UNITED STATES PATENT OFFICE 2,378,787

EYE MOUNTING FOR DOLLS

Salvatore Paganello, Brooklyn, N. Y.

Application October 20, 1943, Serial No. 506,952

1 Claim. (Cl. 46—169)

This invention relates to eye mountings for dolls and the same has particular reference to an eye mounting which is so constructed and arranged as to resiliently support the eyes in accurate registration with the eye openings so as to permit of the free oscillatory movement of the eyes without binding of the eyes against the edges of the eye openings and the invention is an improvement on the eye mounting described in my prior United States Letters Patent No. 2,296,179 granted September 15, 1942.

The invention has in view an eye mounting, composed of parts adapted to be secured together in relatively fixed positions with reference to each other for facilitating the accurate adjustment of the eyes in registration with the eye openings and which provides a bearing resiliently supporting the shaft carrying the eyes so as to maintain the eyes in resilient engagement with the edges of the eye openings while permitting of free oscillatory movement thereof.

The invention further provides an eye mounting composed of interfitting parts, one of which is affixed to the doll's head and the other providing a resilient bearing for the eyes and which is adapted to be secured to said fixed part in relative longitudinal positions with reference thereto to thereby provide means for varying the positions of the eyes in accordance with variations in the locations of the eye openings and said last mentioned part being provided with a leaf spring tensioned against said shaft so as to maintain the eyes in resilient engagement with the edges of the eye openings.

With the foregoing and other objects in view, reference is now made to the following specification and accompanying drawing in which there is illustrated the preferred embodiment of the invention.

In the drawing:

Fig. 1 is a vertical section through a doll's head illustrating a rear view of the eye mounting and eyes in applied position.

Fig. 2 is a vertical sectional view taken approximately on line 2—2 of Fig. 1.

Fig. 3 is an enlarged fragmentary transverse sectional view taken approximately on line 3—3 of Fig. 1.

Fig. 4 is a vertical sectional view through the doll's head illustrating the eyes and eye mounting in elevation.

Fig. 5 is a collective perspective view of the eye mounting members.

Referring to the drawing by characters of reference, the doll's head is of hollow formation and is constructed of front and rear sections which are cemented together after the eye mounting and eyes have been installed. As illustrated in the drawing only the front section 10 is shown which is formed with eye openings 11 and provided with an eye mounting 12 for supporting the eyes 13 secured at the ends of a rock shaft 14.

The eye mounting 12 includes a fixed member 15 consisting of an elongated strip of metal or other equivalent stiff bendable material which is provided with a plurality of tongues 16 projecting outwardly at each side edge thereof substantially at right angles to the plane of the strip and arranged with the tongues on one edge in transverse alignment with the tongues on the other edge. The fixed member 15 is secured to the head in any desired manner and as illustrated the same is embedded in the wall thereof with the elongated strip disposed vertically of the head and substantially centrally between the eye openings 11 and with the tongues 16 projecting rearwardly into the hollow interior of the head. This disposes the tongues on each side of the strip in vertical alignment and the tongues on opposite sides of the strip in transverse spaced relation and in transverse alignment respectively.

The eye mounting 12 also includes a supporting member 17 which provides a bearing for the rock shaft 14 and which member is adjustable longitudinally of the fixed member 15 within small limits and is adapted to be secured thereto for supporting the eyes in registry with the eye openings. The supporting member 17 includes a bridge 18 having flanges 19 at the opposite ends thereof which are disposed in parallel relation and which project beyond the opposite side edges of the bridge. The flanges are formed with aligned recesses 20 extending inwardly in the forward edges thereof in which the rock shaft 14 is mounted to dispose the eyes 13 for free rocking movement at the eye openings. The flanges are spaced apart a distance to receive therebetween the tongues 16 of the fixed member 15 with the upper and lower pairs of tongues disposed on opposite sides of the bridge 18 while the bridge is of a width slightly narrower than the distance between the tongues at each side edge of the fixed member 15 whereby the supporting member 17 may be adjusted longitudinally of the fixed member in order to dispose the eyes in accurate registration with the eye openings. When so adjusted the ends of the tongues 16 are bent outwardly and forwardly into overlying impinging relation upon the inner edges of the flanges 19 to thereby secure the supporting member 17 upon the fixed member 15 with the forward edges of the flanges 19 bearing against the flattened portion 21 of the inner surface of the doll's head.

In order to provide means for resiliently mounting the eyes so as to avoid binding thereof against the edges of the eye openings, a leaf spring 22 is provided which is secured at its upper end to the forward face of the offset inwardly inclined end 23 of an upwardly projecting tongue 24 carried by the bridge 18 to thereby dispose the spring 22 in depending inclined relation between the flanges 19 and with the free end thereof tensioned against the rock shaft 14 so as to resiliently urge the eyes into engagement with the edges of the eye openings. The tongue 24 is relatively narrower than the distance between the flanges 19 whereby notches or slots 25 are formed therebetween through which the upper pair of tongues 16 project.

The spring 22 is pivotally secured to the offset end 23 of the tongue 24 by a pivot pin 26 which permits lateral swinging movement of the spring between the flanges 19 and the spring is bifurcated at its free end forming a recess 27 between the furcations which have rounded lower ends 28. The recess 27 is adapted to receive therein the depending rod 29 of a pendulum 30 secured to the rock shaft 14 for imparting oscillatory or rocking movement to the rock shaft and eyes by the tilting of the doll. When the pendulum is swung inwardly so as to render the lid portions of the eyes visible at the eye openings, the rod 29 of the pendulum will enter the recess 27, the rounded lower ends of the furcations functioning to direct the rod therein while the spring 22 is free to swing laterally on the pivot pin 26 to prevent binding of the rod against the edges of the recess.

The bridge 18 is provided with a sight opening 31 for viewing the rock shaft 14 therethrough when adjusting the supporting member 17 upon the fixed member 15 of the eye mounting to thereby facilitate the positioning of the supporting member with the eyes in accurate registration with the eye openings.

I claim:

In an eye mounting for dolls, interengageable eye mounting members including a member affixed to the doll's head between the eye openings and having a plurality of tongues projecting rearwardly into the interior of the head, an eye supporting member including a bridge porton having side flanges at the oposite longitudinal edges thereof and adapted to receive said tongues alongside of said flanges said tongues projecting inwardly therebeyond for securing said eye mounting members together by the impingement of the projecting portions against said flanges, said flanges each having a recess extending inwardly from the forward edge thereof, a rock shaft positioned in said recesses and having eyes secured upon opposite ends thereof for rocking movement of the eyes at the eye openings, said bridge portion having an upwardly extending tongue provided with an offset extremity a leaf spring pivotally secured at one end to the offset extremity of said upwardly extending tongue so as to dispose the spring in inclined depending relation with the free end thereof disposed between said flanges and tensioned against said rock shaft for maintaining the eyes in resilient engagement against the edges of the eye openings, and a rod secured to and depending from said rock shaft and having a weight at its lower end defining a pendulum for effecting rocking movement of said rock shaft, said spring having a bifurcated free end providing a recess between the furcations for receiving therein the rod of said pendulum when the same swings inwardly and said spring being laterally swingable on its pivotal connection to prevent binding of said rod against the edges of said recess in the spring.

SALVATORE PAGANELLO.